US012719205B2

(12) United States Patent
Kitamura

(10) Patent No.: US 12,719,205 B2
(45) Date of Patent: Aug. 25, 2026

(54) CONNECTOR WITH A SEAL

(71) Applicant: SUMITOMO WIRING SYSTEMS, LTD., Mie (JP)

(72) Inventor: Keishi Kitamura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 343 days.

(21) Appl. No.: 18/616,870

(22) Filed: Mar. 26, 2024

(65) Prior Publication Data

US 2024/0332854 A1 Oct. 3, 2024

(30) Foreign Application Priority Data

Mar. 27, 2023 (JP) ................................ 2023-049284

(51) Int. Cl.
*H01R 13/52* (2006.01)

(52) U.S. Cl.
CPC ................................ *H01R 13/5202* (2013.01)

(58) Field of Classification Search
CPC .................................................. H01R 12/5202
See application file for complete search history.

(56) References Cited

U.S. PATENT DOCUMENTS 3,952,218 A * 4/1976 Deters .................... H02K 5/132 310/71
2010/0127007 A1* 5/2010 Dodgen .................... A45F 3/20 53/473
2012/0156910 A1 6/2012 Akiguchi et al.

* cited by examiner

*Primary Examiner* — Neil Abrams
(74) *Attorney, Agent, or Firm* — Venjuris, P.C.

(57) ABSTRACT

A seal member includes a plurality of seal holes in an intimate contact state, a plurality of first insertion holes that are open to one seal facing surface facing the housing member, and are arranged around the seal holes, and a plurality of second insertion holes that are open to the one seal facing surface, and are arranged at four corners of an outer periphery of a portion having the first insertion holes and the seal holes. The housing member includes a plurality of first protrusions that protrude from the other housing facing surface facing the seal member and are arranged to be respectively insertable into the first insertion holes, and a plurality of second protrusions that protrude from the other housing facing surface, have a protrusion length larger than that of the first protrusions, and are arranged to be respectively insertable into the second insertion holes.

5 Claims, 6 Drawing Sheets

CONNECTOR WITH A SEAL

CROSS-REFERENCE TO RELATED APPLICATIONS

This application is based on and claims priority from Japanese Patent Application No. 2023-049284, filed on Mar. 27, 2023, with the Japan Patent Office, the disclosure of which is incorporated herein in its entirety by reference.

TECHNICAL FIELD

The present disclosure relates to a connector.

BACKGROUND

The connector disclosed in Japanese Patent Laid-open Publication No. 2012-129149 includes a housing member (an outer housing), and a holder member (an inner housing) that holds a seal member (a wire seal) between the housing member and the holder member. A plurality of boss pins protrude from a surface of the housing member facing the seal member. The seal member has a plurality of pin insertion holes that are open to the surface facing the housing member and into which the plurality of boss pins are respectively insertable. Also, the seal member has a plurality of seal holes (contact insertion holes) through which wires are inserted in an intimate contact state. Pin insertion holes are respectively formed at four corners of an outer peripheral portion of the seal holes.

SUMMARY

In general, if a seal member has a plurality of seal holes, when a wire is inserted into one seal hole of the seal member, there are cases where the diameter of the one seal hole expands, and the position of the other seal hole adjacent to the one seal hole fluctuates, making it impossible to correctly insert a wire into the other seal hole. To address this, Japanese Patent Laid-open Publication No. 2012-129149 has a configuration in which the wires can be correctly inserted into the seal holes because the boss pins are respectively inserted into pin insertion holes and expansion of the diameters of the seal holes can be restricted. However, because there are many positions at which the boss pins are respectively inserted into the pin insertion holes, there are cases where a boss pin is not correctly inserted into the corresponding pin insertion hole. If a boss pin pierces an opposing surface of the seal member, then the seal member is damaged, and in the worst case, a new seal member needs to be prepared, and the operation of attaching the seal member to the housing member need to be performed again.

In view of this, the present disclosure aims to provide a connector capable of improving ease of assembly.

A connector according to the present disclosure includes a seal member, and a housing member that holds the seal member, in which the seal member includes a plurality of seal holes for passage of wires in an intimate contact state, a plurality of first insertion holes that are open to one seal facing surface facing the housing member and are arranged around the seal holes, and a plurality of second insertion holes that are open to the one seal facing surface and are arranged at four corners of an outer periphery of a portion having the first insertion holes and the seal holes, and the housing member includes a plurality of cavities that are respectively in communication with the seal holes and in which the wires are to be disposed, a plurality of first protrusions that protrude from another housing facing surface facing the seal member and are arranged to be respectively insertable into the first insertion holes, and a plurality of second protrusions that protrude from the other housing facing surface, have a protrusion length larger than that of the first protrusions, and are arranged to be respectively insertable into the second insertion holes.

According to the present disclosure, it is possible to provide a connector capable of improving ease of assembly.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
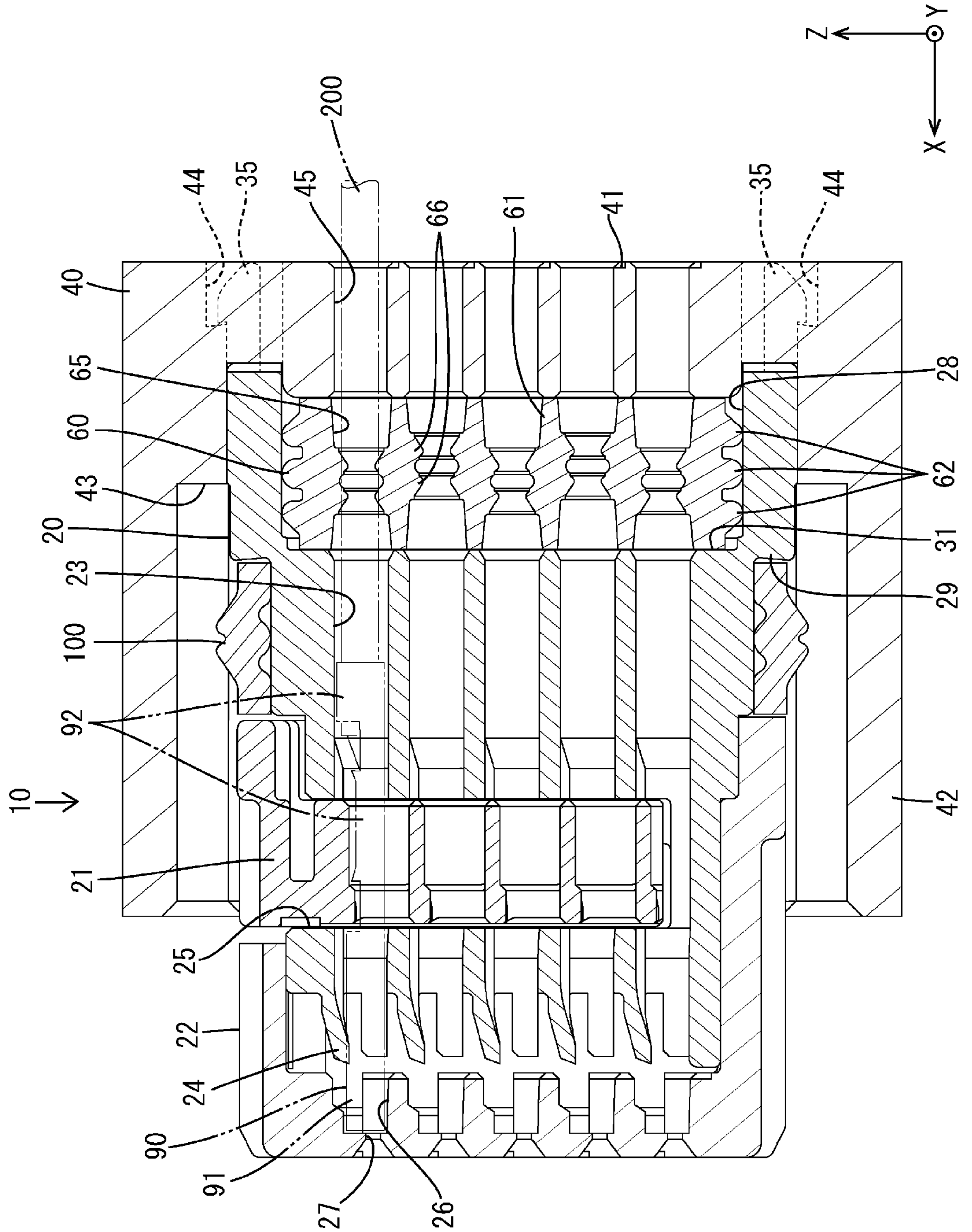
FIG. 1 is a side cross-sectional view of a connector in Embodiment 1.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF THE PRESENT DISCLOSURE

First, an embodiment of the present disclosure will be listed and described.

(1) A connector according to the present disclosure includes: a seal member; and a housing member that holds the seal member, in which the seal member includes a plurality of seal holes for passage of wires in an intimate contact state, a plurality of first insertion holes that are open to one seal facing surface facing the housing member and are arranged around the seal holes, and a plurality of second insertion holes that are open to the one seal facing surface and are arranged at four corners of an outer periphery of a portion having the first insertion holes and the seal holes, and the housing member includes a plurality of cavities that are respectively in communication with the seal holes and in which the wires are to be disposed, a plurality of first protrusions that protrude from another housing facing surface facing the seal member and are arranged to be respectively insertable into the first insertion holes, and a plurality of second protrusions that protrude from the other housing facing surface, have a protrusion length larger than that of the first protrusions, and are arranged to be respectively insertable into the second insertion holes.

With the above configuration, the four corners of the seal member can be positioned with respect to the housing member by respectively inserting the second protrusions into the second insertion holes in a process of attaching the seal member to the housing member. A state in which the first protrusions are correctly inserted into the corresponding first insertion holes can be achieved by respectively inserting the first protrusions into the first insertion holes arranged on the inner peripheral side of the four corners. When the first protrusions are respectively inserted into the first insertion holes, it is possible to prevent the diameters of the seal holes from greatly expanding when a wire is inserted therein. Therefore, with the above configuration, it is possible to improve ease of assembly when the seal member is attached to the housing member.

(2) It is preferable that, in the connector according to (1) above, the second insertion holes are longer than the first insertion holes when viewed in a thickness direction of the seal member, With the configuration, a second protrusion having a longer protrusion length than a first protrusion can be easily inserted into the corresponding second insertion hole.

(3) It is preferable that the connector according to (2) above includes a holder member that holds the seal member between the holder member and the housing member, in which the holder member includes a plurality of through holes that are in communication with the seal holes and in which the wires are to be disposed, and a plurality of third protrusions that protrude from peripheries of the through holes, on one holder facing surface facing the seal member, the seal member includes a plurality of third insertion holes that are arranged side-by-side with the first insertion holes in the thickness direction and are open to another seal facing surface facing the holder member, the third protrusions are respectively insertable into the third insertion holes, and the second insertion holes are each longer than the first insertion holes and the third insertion holes when viewed in the thickness direction.

Because the second insertion holes are arranged on the outer peripheral side of the four corners of the seal member, it is possible to easily realize a shape in which the second insertion holes are longer than the first insertion holes and the third insertion holes when viewed in the thickness direction as in the above configuration.

(4) It is preferable that, in the connector according to any one of (1) to (3) above, the housing member has a housing recess in which the seal member is housed, the seal member has a plurality of seal lips that are in intimate contact with an inner peripheral surface of the housing recess, the seal lips are arranged on an outer periphery of the seal member side-by-side in the thickness direction of the seal member, and the second insertion holes are formed in a length range such that the second insertion holes overlap the plurality of seal lips when viewed in the thickness direction.

With the above configuration, by respectively inserting the second protrusions into the second insertion holes, the second protrusions can be arranged at positions corresponding to the seal lips that are arranged side-by-side in the thickness direction of the seal member. As a result, with the configuration, each seal lip can be compressed with an appropriate compression force between the second protrusion and the inner peripheral surface of the housing recess, and the sealing property of the seal member with respect to the housing member can be improved.

(5) It is preferable that, in the connector according to any one of (1) to (4) above, the second protrusions each have a larger diameter than the first protrusions.

With the above configuration, by respectively inserting the second protrusions into the second insertion holes, the four corners of the seal member can be reliably positioned with respect to the housing member.

DETAILS OF EMBODIMENTS OF PRESENT DISCLOSURE

Specific examples of the present disclosure will be described below with reference to the drawings. Note that the present invention is not limited to these examples, and is defined by the claims, and all changes that come within the meaning and range of equivalency of the claims are intended to be embraced therein.

Embodiment 1

As shown in FIG. 1, a connector 10 according to Embodiment 1 includes a housing member 20, a holder member 40, a seal member 60, and a terminal fitting 90. Also, the connector 10 includes a retainer 21, a front member 22, and a seal ring 100. The connector 10 is fitted to a counterpart connector (not shown). Note that, in the following description, the surface side where the connector 10 is fitted to the counterpart connector is referred to as the front side in the front-rear direction. An up-down direction is based on the up-down direction shown in FIG. 1. In FIG. 1, an arrow X indicates the front side, an arrow Y indicates the right side, and an arrow Z indicates the upper side. These directional references do not necessarily match the directional references in a state in which the connector 10 is mounted on a vehicle (not shown) or the like.

(Housing Member 20, Terminal Fitting 90, and the Like)

Figure 2:
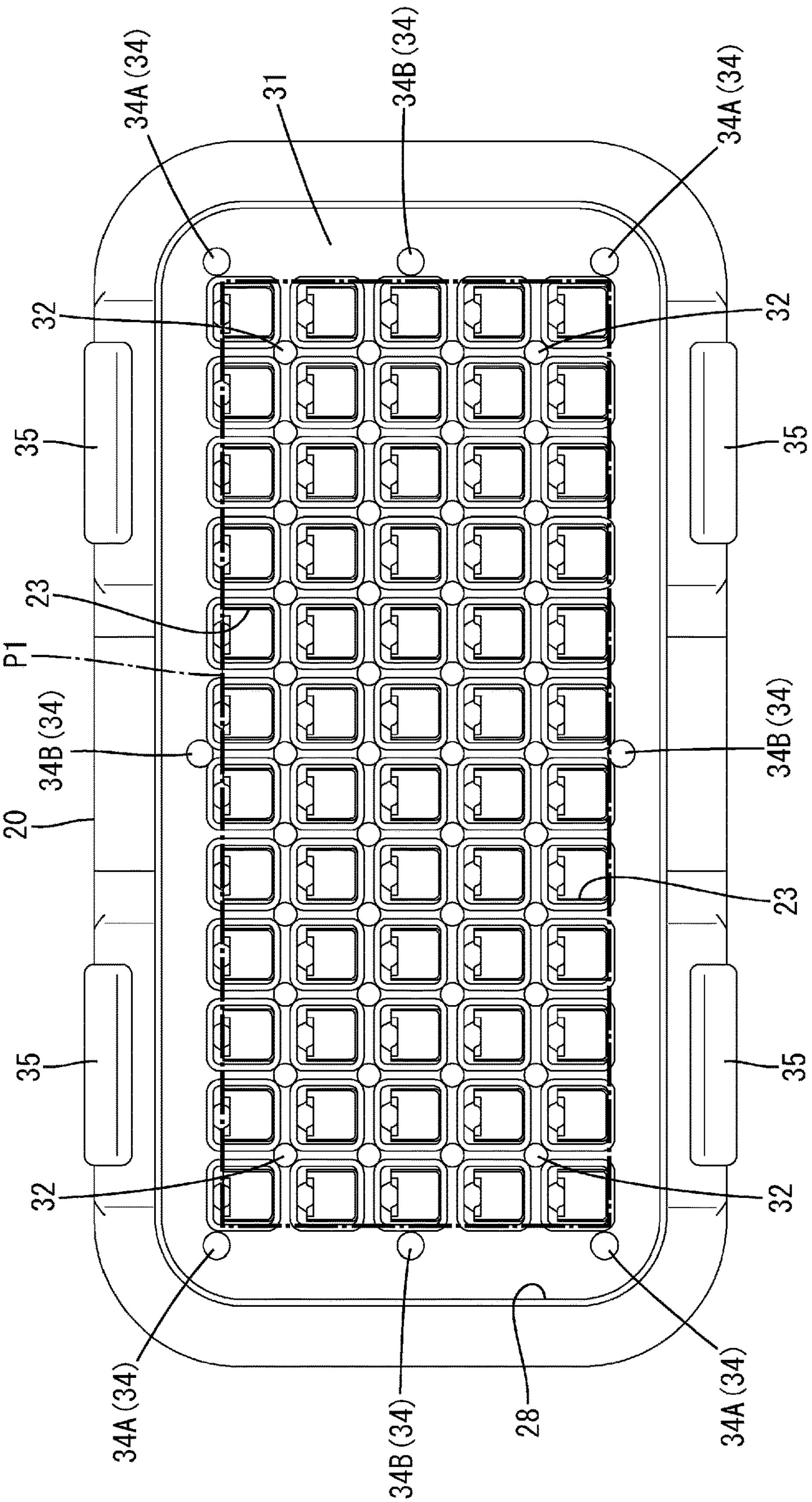
FIG. 2 is a rear view of a housing member in Embodiment 1.

The housing member 20 is made of a synthetic resin, and is configured as an inner housing in Embodiment 1. Although details are not shown, the housing member 20 has a rectangular block shape and has a plurality of cavities 23 as shown in FIG. 2. The cavities 23 extend through the housing member 20 in the front-rear direction, and are arranged in large numbers vertically and horizontally. As shown in FIG. 1, the housing member 20 has lances 24 that protrude inward of the corresponding cavities 23.

The terminal fitting 90 is made of a conductive metal and is inserted into the cavity 23 from the rear. As shown in FIG. 1, the terminal fitting 90 indicates an example of a female terminal fitting, and has a tubular connection portion 91 at its front portion. The terminal fitting 90 locks the connection portion 91 to a lance 24, and is temporarily prevented from coming off inside the cavity 23. When a tab of a counterpart terminal fitting (not shown) is disposed inside the connection portion 91 and comes into contact with an elastic contact piece (not shown) formed inside the connection portion 91, the terminal fitting 90 and the counterpart terminal fitting are electrically connected to each other. Also, the terminal fitting 90 has a barrel portion 92 that is located behind the connection portion 91 and is electrically and mechanically connected to a terminal portion (front end portion) of a wire 200.

The housing member 20 has a retainer mounting hole 25 that is in communication with the cavities 23 at intermediate portions in the front-rear direction. The retainer mounting hole 25 is open to an upper surface of the housing member 20. The retainer 21 is made of a synthetic resin and has a plate shape, and is inserted into the retainer mounting hole 25 from above to lock the terminal fitting 90. The retainer 21 secondarily prevents the terminal fitting 90 from coming off inside the cavity 23.

The front member 22 is made of a synthetic resin, has a cap shape, and is attached to the housing member 20 from the front. A front portion of the connection portion 91 of the terminal fitting 90 is fitted into a recess 26 in the front member 22 to be positionable. The tab is inserted into the cavity 23 through a tab insertion hole 27 of the front member 22, and is connectable to the terminal fitting 90.

The housing member 20 has a housing recess 28 at the rear that is open rearward. The seal member 60 is inserted from the rear into the housing recess 28 and is housed therein. A step portion 29, which increases in size toward the housing recess 28, is formed on the outer surface of the housing member 20. The seal ring 100 is made of rubber such as silicone rubber, and although details are not shown, has a rectangular ring shape with rounded corners, and is mounted on the outer surface of the housing member 20. The step portion 29 prevents the seal ring 100 from coming off rearward. The seal ring 100 is a member interposed between the connector 10 and the counterpart connector that are fitted to each other to realize a seal.

An inner surface of the housing recess 28 on the back side where the cavities 23 are open is configured as the other housing facing surface 31 facing one seal facing surface 63, which will be described later. As shown in FIG. 2, the other housing facing surface 31 is arranged along the up-down direction and the left-right direction, and has a horizontal dimension (width length) larger than a vertical dimension (height length).

Figure 6:
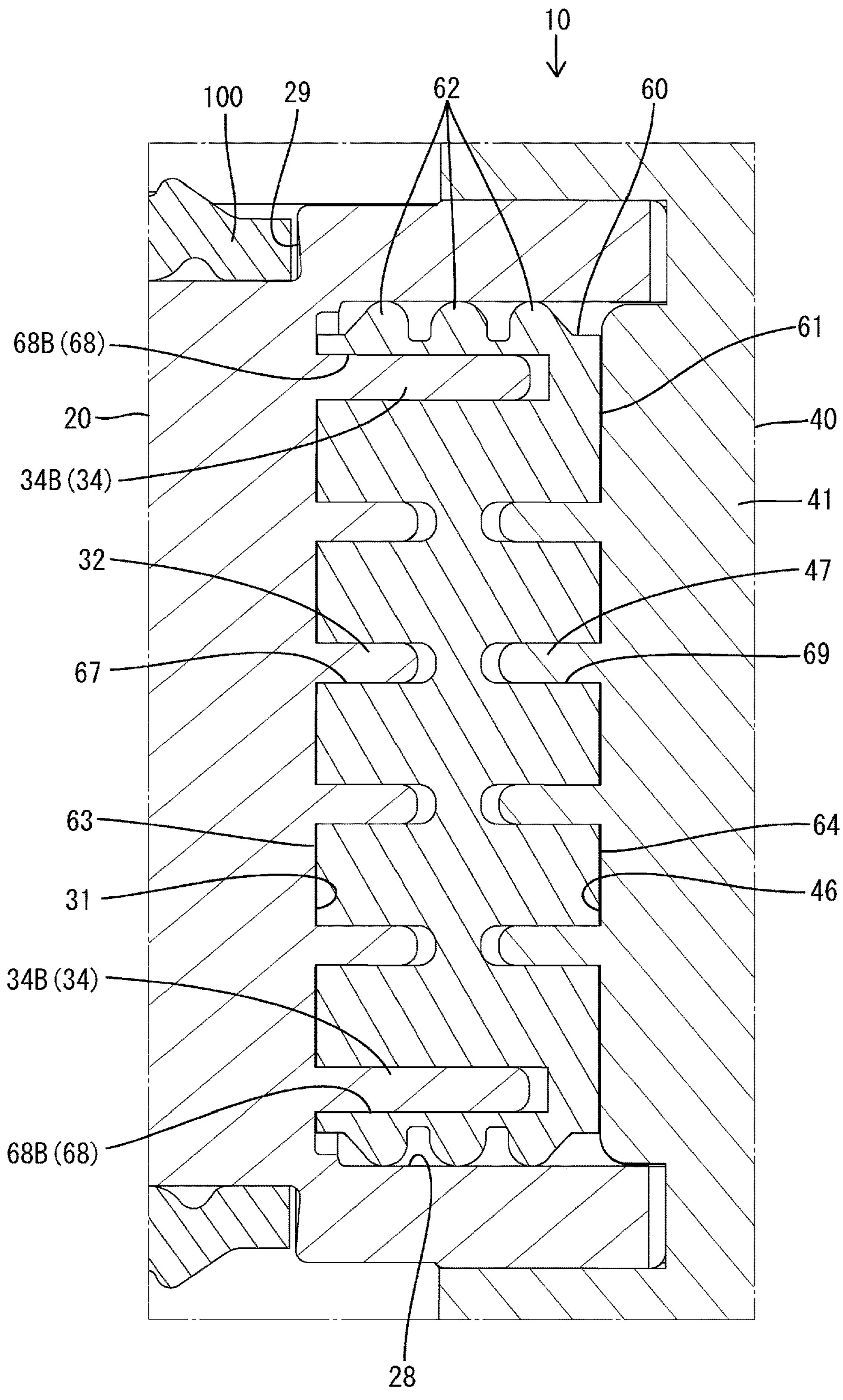
FIG. 6 is a partially enlarged side cross-sectional view showing a state in which the connector is cut at a position different from that in FIG. 1, and the seal member is positioned and arranged to be able to be held between the housing member and the holder member.

The cavities 23 are open to the other housing facing surface 31 in a rectangular opening shape. The housing member 20 includes a plurality of first protrusions 32 that protrude from the other housing facing surface 31. The first protrusions 32 each have a pin shape (round columnar shape) having a circular cross-section, and have the same shape and the same size. As shown in FIG. 6, a leading end (rear end) of each first protrusion 32 is rounded into a hemispherical shape. The first protrusions 32 are arranged in a scattered manner around each cavity 23 on the other housing facing surface 31. Specifically, the first protrusions 32 are arranged at lattice points between cavities 23 on the other housing facing surface 31 in portions where the cavities 23 are partitioned vertically and horizontally into a lattice shape. In the case of Embodiment 1, the first protrusions 32 are arranged at four corners of the outer periphery of each cavity 23 on the other housing facing surface 31, except for the cavities 23 arranged at the outermost periphery.

Also, the housing member 20 has a plurality of second protrusions 34 protruding from an outer periphery of a cavity portion P1 (a portion surrounded by a dashed-dotted line in FIG. 2) where the cavities 23 and the first protrusions 32 are aligned on the other housing facing surface 31. The second protrusions 34 each have a pin shape (round columnar shape) having a circular cross-section, and have the same shape and the same size. As shown in FIG. 6, a leading end (rear end) of each second protrusion 34 is rounded into a hemispherical shape.

The length by which each second protrusion 34 protrudes from the other housing facing surface 31 is larger than the length by which each first protrusion 32 protrudes therefrom. In other words, the leading end (rear end) of the second protrusion 34 is located further forward (backward) of the leading end of the first protrusion 32. Also, the diameter (thickness) of the second protrusions 34 is larger than the diameter of the first protrusions 32.

As shown in FIG. 2, the second protrusion 34 is arranged adjacent to the corresponding cavity 23 on the outer peripheral side of the other housing facing surface 31. Specifically, the second protrusions 34 include four corner protrusions 34A respectively disposed at the four corners of the outer periphery of the cavity portion P1, and four intermediate protrusions 34B disposed at intermediate portions in the up-down direction and the left-right direction of the adjacent corner protrusions 34A, on the other housing facing surface 31. The intermediate protrusions 34B, which form a pair in the up-down direction, are disposed at the centers in the left-right direction of the other housing facing surface 31. The intermediate protrusions 34B, which form a pair in the left-right direction, are disposed at the centers in the up-down direction on the other housing facing surface 31.

Also, the housing member 20 has a pair of left and right locking portions 35 that protrude rearward from an upper wall and a lower wall of the housing recess 28. Each locking portion 35 has a plate shape extending along the left-right direction, and can be locked to a later-described locking reception portion 44 of the holder member 40 (see FIG. 1).

(Seal Member 60)

The seal member 60 is made of rubber such as silicone rubber, and has a mat-like seal main body 61 that is thick in the front-rear direction.

As shown in FIG. 6, a front surface of the seal main body 61 is configured as one seal facing surface 63 that faces the other housing facing surface 31 of the housing member 20 to be able to come into surface contact with the other housing facing surface 31. A rear surface of the seal main body 61 is configured as another seal facing surface 64 that faces in surface contact with one holder facing surface 46, which will be described later.

Figure 3:
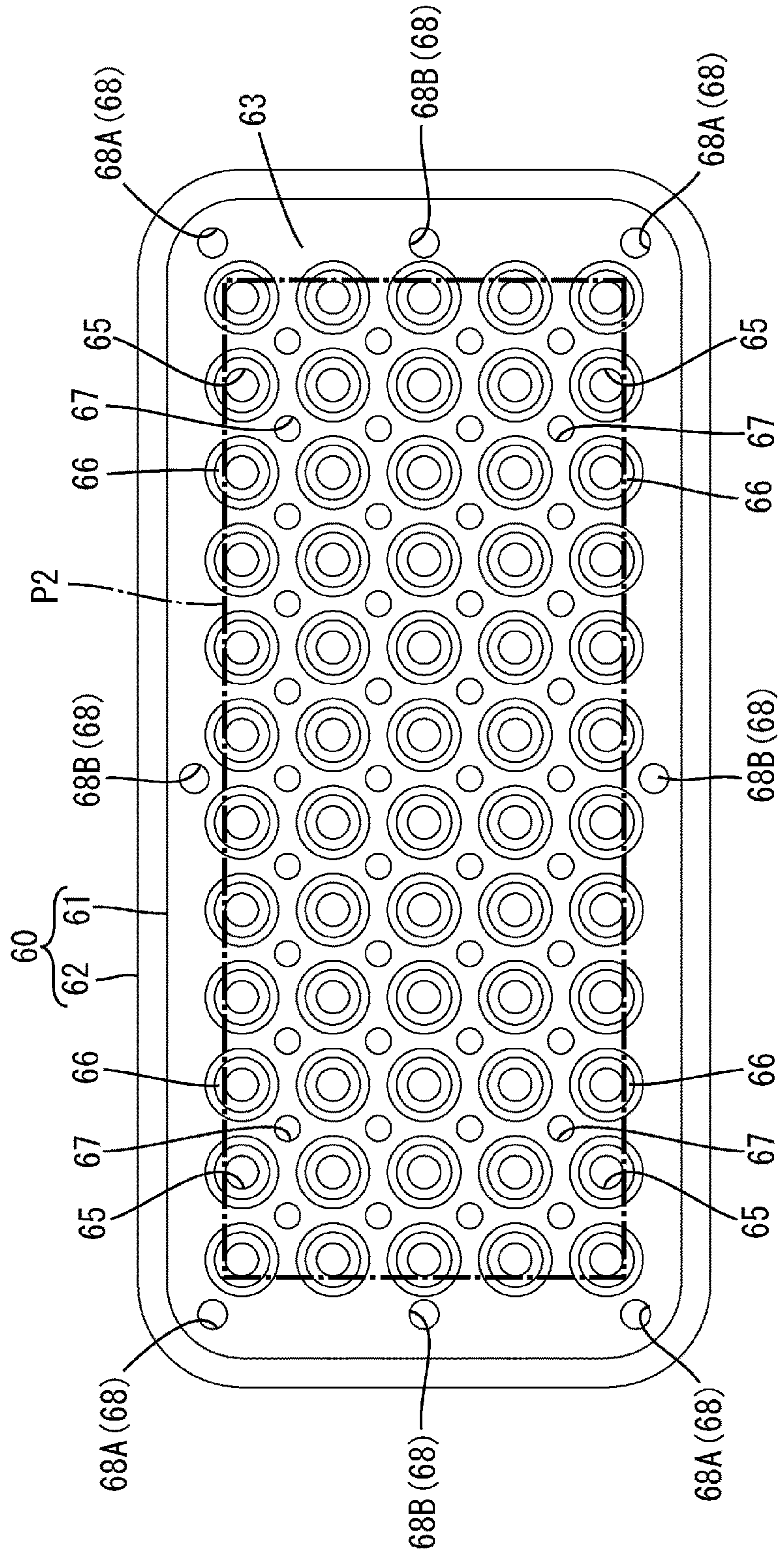
FIG. 3 is a front view of a seal member in Embodiment 1.
Figure 4:
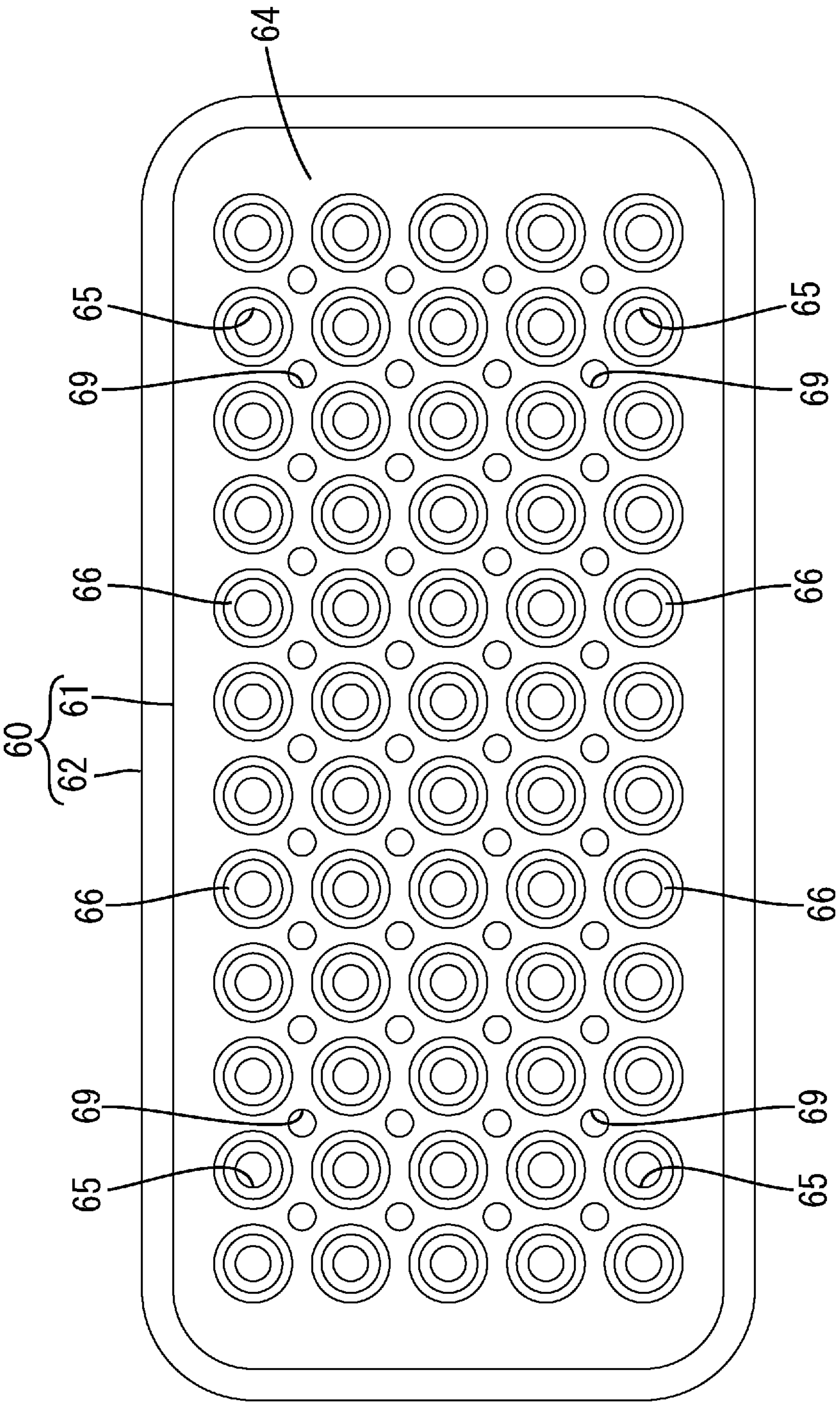
FIG. 4 is a rear view of the seal member in Embodiment 1.

As shown in FIGS. 3 and 4, the one seal facing surface 63 and the other seal facing surface 64 are arranged along the up-down direction and the left-right direction, and each have a horizontal dimension (width length) larger than a vertical dimension (height length). Also, the one seal facing surface 63 and the other seal facing surface 64 both have a rectangular outer shape with four rounded corners, and are formed symmetrically on the front side and the back side.

The seal main body 61 includes a plurality of seal holes 65 that extend from the one seal facing surface 63 to the other seal facing surface 64 in the front-rear direction (thickness direction). Each seal hole 65 has a circular cross-sectional shape. As shown in FIG. 1, a plurality of inner circumferential lips 66 are formed side-by-side in the front-rear direction on inner circumferential surfaces of the seal holes 65. The wires 200 connected to the terminal fittings 90 are inserted into the respective seal holes 65. The inner circumferential lips 66 are respectively arranged in intimate contact with the outer circumferential surfaces of the wires 200 in a crushed state.

As shown in FIG. 3, the seal main body 61 has a plurality of first insertion holes 67. The first insertion holes 67 each have a circular cross-section, extend with a constant diameter through the seal main body 61 in the front-rear direction, and have the same shape and the same size. The front ends of the first insertion holes 67 are open to the one seal facing surface 63. As shown in FIG. 6, the rear end of each first insertion hole 67 is closed at an intermediate portion of the seal main body 61 in the front-rear direction (thickness direction), specifically, at a position closer to the front relative to the center of the seal main body 61 in the front-rear direction. The rear end of each first insertion hole

67 has a hemispherical recessed shape. As shown in FIG. 3, the one seal facing surface 63 has a seal portion P2 (a portion surrounded by a dashed-dotted line in FIG. 3) where the seal holes 65 (holes for passage of the wires 200) are open, except for the outer peripheral side.

The front end of each first insertion hole 67 is open to the seal portion P2 of the one seal facing surface 63. The first insertion holes 67 are arranged at positions corresponding to the seal holes 65 in a scattered manner around the seal holes 65. Specifically, the first insertion holes 67 are arranged at four corners of the outer peripheries of the seal holes 65, except for the seal holes 65 arranged at the outermost periphery.

As shown in FIG. 3, the seal main body 61 has a plurality of second insertion holes 68 in addition to the first insertion holes 67. The second insertion holes 68 each have a circular cross-section, extend with a constant diameter through the seal main body 61 in the front-rear direction, and have the same shape and the same size. The diameter of the second insertion holes 68 is larger than the diameter of the first insertion holes 67. The front ends of the second insertion holes 68 are open on the outer peripheral side of the one seal facing surface 63. As shown in FIG. 6, the rear ends of the second insertion holes 68 are closed at a rear portion of the seal main body 61 (the rear portion in the thickness direction). That is, the second insertion holes 68 are each longer than the first insertion holes 67 in the front-rear direction.

As shown in FIG. 3, the front end of each second insertion hole 68 is not open to the seal portion P2, and is open on the outer peripheral side of the seal portion P2, on the one seal facing surface 63. Specifically, the front ends of the second insertion holes 68 are open at positions in the up-down direction and the left-right direction on the outer peripheral side of the seal portion P2 of the one seal facing surface 63 at intervals in the circumferential direction.

When the one seal facing surface 63 is viewed from the front, the second insertion holes 68 include four corner insertion holes 68A respectively arranged at the four corners on the outer peripheral side of the seal portion P2, and four intermediate insertion holes 68B arranged at intermediate portions in the up-down direction and the left-right direction of the adjacent corner insertion holes 68A. The intermediate insertion holes 68B, which form a pair in the up-down direction, are arranged at the centers in the left-right direction of the one seal facing surface 63. The intermediate insertion holes 68B, which form a pair in the left-right direction, are arranged at the centers in the up-down direction of the one seal facing surface 63. The seal member 60 has a point-symmetrical shape with the center of the one seal facing surface 63 as the center of symmetry when viewed from the front.

Also, as shown in FIG. 4, the seal main body 61 has a plurality of third insertion holes 69, in addition to the first insertion holes 67 and the second insertion holes 68. The third insertion holes 69 each have a circular cross-section, extend with a constant diameter through the seal main body 61 in the front-rear direction, and have the same shape and the same size. The rear ends of the third insertion holes 69 are open to the other seal facing surface 64. As shown in FIG. 6, the front end of each third insertion hole 69 is closed at an intermediate portion of the seal main body 61 in the front-rear direction (thickness direction), specifically, at a position closer to the rear relative to the center of the seal main body 61 in the front-rear direction. The front end of each first insertion hole 67 has a hemispherical recessed shape.

The third insertion holes 69 and the first insertion holes 67 have the same shape and the same size. The third insertion holes 69 and the first insertion holes 67 are symmetrical with each other across the center of the seal main body 61 in the front-rear direction, and are arranged coaxially in the front-rear direction in the seal main body 61.

As shown in FIG. 6, the seal member 60 has a plurality of seal lips 62 that protrude from the outer peripheral surface of the seal main body 61. Three seal lips 62 are arranged side-by-side on the outer peripheral surface of the seal main body 61 in the front-rear direction. As shown in FIGS. 3 and 4, the seal lips 62 are formed on the entire outer peripheral surface of the seal main body 61. As shown in FIGS. 1 and 6, in the state in which the seal member 60 is housed in the housing recess 28, the seal lips 62 are arranged in intimate contact with the inner peripheral surface (a surface orthogonal to the other housing facing surface 31) of the housing recess 28 in a crushed state. As shown in FIG. 6, the third insertion holes 69 re arranged at positions close to the seal lips 62 on the outer peripheral side of the seal main body 61, and have a length such that the third insertion holes 69 overlap (correspond to) all the seal lips 62 in the front-rear direction.

(Holder Member 40)

The holder member 40 is made of a synthetic resin, and is configured as an outer housing in the case of Embodiment 1. As shown in FIG. 1, the holder member 40 includes a plate-shaped holder main body 41 that is thick in the front-rear direction, a fitting tubular portion 42 that covers the outer periphery of the holder main body 41, and a linking portion 43 that links rear ends of the holder main body 41 and the fitting tubular portion 42 together.

Figure 5:
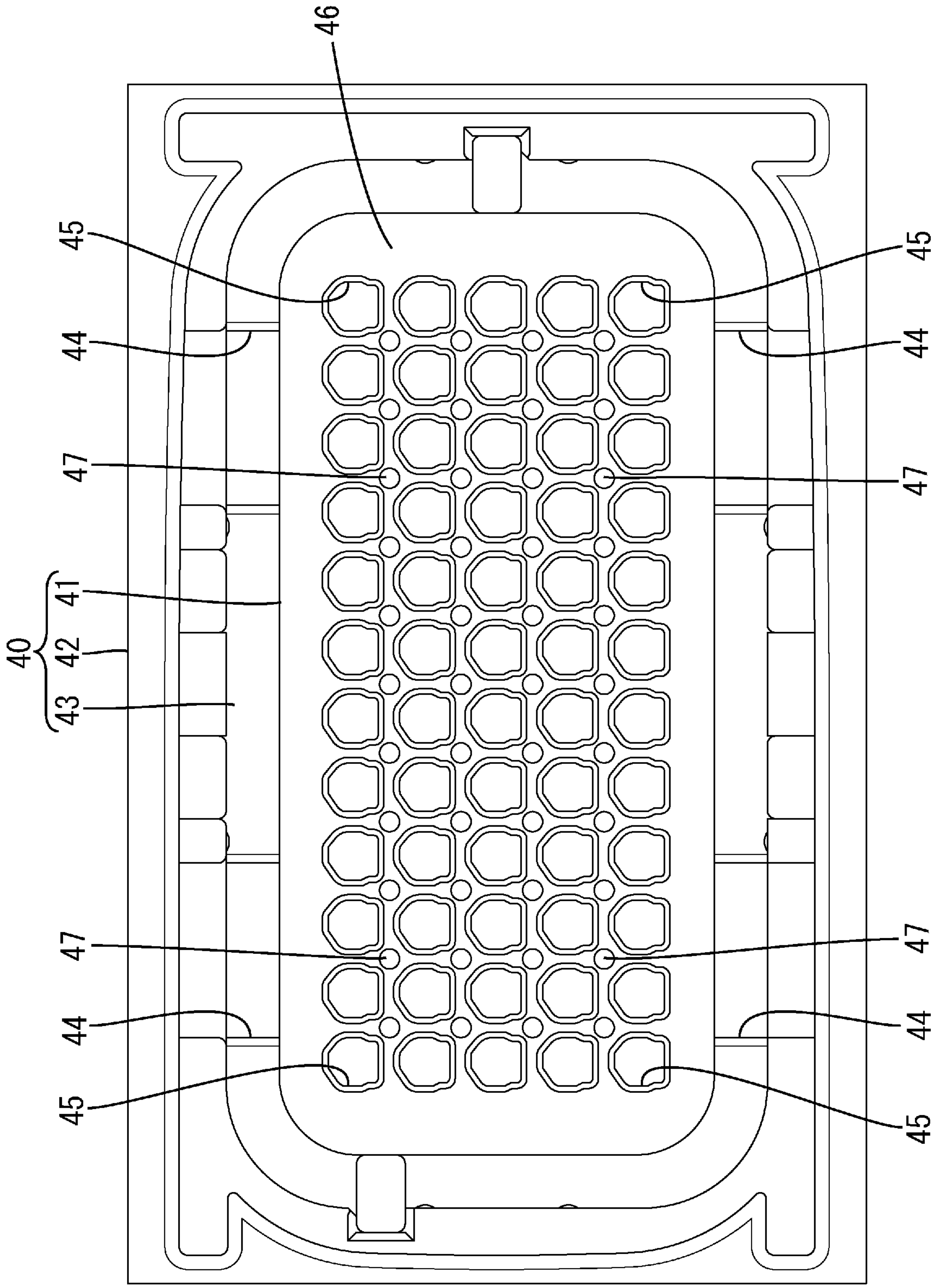
FIG. 5 is a front view of a holder member in Embodiment 1.

The holder member 40 is attached to the housing member 20 from the rear. As shown in FIG. 5, the holder member 40 includes a pair of left and right locking reception portions 44 that pass through an upper end portion and a lower end portion of the linking portion 43. As shown in FIG. 1, by inserting the locking portions 35 to the locking reception portions 44 so that the locking portions 35 can be locked thereto, it is possible to maintain a state in which the holder member 40 is attached to the housing member 20. When the holder member 40 is attached to the housing member 20, the fitting tubular portion 42 is disposed to cover the outer peripheral surface of the housing member 20, in addition to the holder main body 41. A hood portion of the counterpart connector (not shown) is inserted between the fitting tubular portion 42 and the housing member 20 in a fitted state.

The holder main body 41 has a plurality of through holes 45 that extend through the holder main body 41 in the front-rear direction (thickness direction). As shown in FIG. 5, the front surface of the holder main body 41 is configured as one holder facing surface 46 extending along the up-down direction and the left-right direction. The holder main body 41 has a plurality of third protrusions 47 that protrude from the one holder facing surface 46. The third protrusions 47 each have a pin shape (round columnar shape) having a circular cross-section, and have the same shape and the same size. As shown in FIG. 6, a leading end (front end) of each third protrusion 47 is rounded into a hemispherical shape. The third protrusions 47 are arranged in a scattered manner around each through hole 45 on the one holder facing surface 46. Specifically, the third protrusions 47 are arranged at four corners of the outer periphery of each through hole 45 on the one holder facing surface 46. Portions that protrude from the one holder facing surface 46 are only the third protrusions 47, and the holder member 40 does not have protruding portions corresponding to the second protrusions 34 of the housing member 20.

(Effects of Connector 10)

When the housing member 20, the seal member 60, and the holder member 40 are assembled, the seal member 60 is first inserted into the housing recess 28 of the housing member 20 from the rear. When insertion of the seal member 60 into the housing recess 28 is started, the second protrusions 34 of the housing member 20 are respectively inserted into the second insertion holes 68 of the seal member 60 in the fitted state. By respectively inserting the second protrusions 34 into the second insertion holes 68, the posture of the seal member 60 attached to the housing member 20 can be corrected. Also, by respectively inserting the second protrusions 34 into the second insertion holes 68, the outer peripheral side of the seal member 60 can be positioned with respect to the housing member 20. This realizes a structure in which deformation of the outer peripheral side of the seal member 60 in the radial direction can be restricted.

In the case of Embodiment 1, by respectively inserting the corner protrusions 34A into corner insertion holes 68A, the four corners of the one seal facing surface 63 of the seal member 60 can be positioned at and supported by the four corners of the other housing facing surface 31 of the housing member 20. Also, by respectively inserting the intermediate protrusions 34B into intermediate insertion holes 68B, intermediate portions in the up-down direction and intermediate portions in the left-right direction of the one seal facing surface 63 of the seal member 60 can be positioned at and supported by the corresponding portions of the other housing facing surface 31 of the housing member 20. The second protrusions 34 are respectively inserted into the second insertion holes 68, and then the first protrusions 32 of the housing member 20 are respectively inserted into the first insertion holes 67 of the seal member 60 in the fitted state. As described above, the outer peripheral side of the seal member 60 is positioned with respect to the housing member 20 at a stage when the first protrusions 32 are respectively inserted into the first insertion holes 67, thus realizing a state in which the first protrusions 32 can be correctly inserted into the corresponding first insertion holes 67.

Then, when the one seal facing surface 63 comes into contact with the other seal facing surface 64 in a surface contact state, the operation of inserting the seal member 60 into the housing recess 28 is stopped. As a result, the entire seal member 60 is housed in the housing recess 28, all of the second protrusions 34 are inserted into the corresponding second insertion holes 68, and all of the first protrusions 32 are inserted into the corresponding first insertion holes 67 (see FIG. 6). The leading end (rear end) of each second protrusion 34 can reach the back end side of the corresponding second insertion hole 68, and the leading end (rear end) of each first protrusion 32 can reach the back end side of the corresponding first insertion hole 67. Also, the seal lips 62 are disposed in intimate contact with the inner peripheral surface of the housing recess 28. The second protrusions 34 are disposed on the inner peripheral sides of the corresponding seal lips 62. Here, each second protrusion 34 is disposed with a length to overlap the entirety of the corresponding seal lip 62 in the front-rear direction. Thus, the seal lips 62 receive a reaction force from the housing recess 28 and the second protrusions 34, and can be interposed between the housing recess 28 and the second protrusion 34 in an appropriately compressed state.

The holder member 40 is then attached to a housing main body from the rear. In the process of attaching the holder member 40 thereto, the locking portions 35 are respectively inserted to the locking reception portions 44, and the operation of attaching the holder member 40 to the housing member 20 can be guided. Then, the third protrusions 47 of the holder member 40 are respectively inserted into the third insertion holes 69 of the seal member 60 in the fitted state. At the stage when the third protrusions 47 are respectively inserted into the third insertion holes 69, the posture of the holder member 40 attached to the housing member 20 can be corrected by the guiding action of the locking portions 35 and the locking reception portions 44. Therefore, it is possible to realize a state in which the third protrusions 47 can be correctly inserted into the corresponding third insertion holes 69.

Thereafter, the terminal fitting 90 is inserted into the cavity 23 from the through hole 45 through the seal hole 65. As shown in FIG. 1, a front end portion of the wire 200 connected to the terminal fitting 90 is disposed at the rear portion of the cavity 23. The wire 200 drawn out from the cavity is disposed in the seal hole 65 in a liquid-tight manner. The wire 200 extending from the seal hole 65 is disposed in the through hole 45.

In the case of Embodiment 1, because the first protrusions 32 are respectively positioned and disposed in the first insertion holes 67 and the second protrusions 34 are respectively positioned and disposed in the second insertion holes 68, when the wire 200 is inserted into the seal hole 65, it is possible to suppress positional fluctuation of the outer periphery of the seal hole 65. Therefore, it is possible to realize a state in which the wires 200 can be correctly inserted into the corresponding seal holes 65.

As described above, according to Embodiment 1, the four corners of the seal member 60 can be positioned with respect to the housing member 20 by respectively inserting the second protrusions 34 into the second insertion holes 68 in a process of attaching the seal member 60 to the housing member 20. Then, a state in which the first protrusions 32 are correctly inserted into the corresponding first insertion holes 67 can be realized by respectively inserting the first protrusions 32 into the first insertion holes 67 in a state in which the four corners of the seal member 60 are positioned. When the first protrusions 32 are respectively inserted into the first insertion holes 67, it is possible to prevent the diameter of seal holes 65 from greatly expanding when a wire 200 is inserted therein. Therefore, according to Embodiment 1, it is possible to improve ease of assembly when the seal member 60 is attached to the housing member 20.

Also, because the second protrusions 34 have a protrusion length larger than that of the first protrusions 32 and the second insertion holes 68 are longer than the first insertion holes 67 in the front-rear direction, a state in which the second protrusions 34 are inserted into the corresponding second insertion holes 68 can be realized with high reliability. In particular, because the second protrusions 34 each have a larger diameter than the first protrusions 32, the outer peripheral side including the four corners of the seal member 60 can be reliably positioned with respect to the housing member 20 by respectively inserting the second protrusions 34 into the second insertion holes 68.

Further, because the second insertion holes 68 are arranged on the outer peripheral side of the seal member 60 away from a portion having the first insertion holes 67 and the third insertion holes 69, it is possible to easily form the second insertion holes 68 extending long enough to exceed half the thickness of the seal member 60.

Further, in the case of Embodiment 1, the second insertion holes 68 are formed in a length range such that the second insertion holes 68 overlap the seal lips 62 in the front-rear direction. Therefore, by respectively inserting the second protrusions 34 into the second insertion holes 68, the second protrusions 34 can be disposed at positions corresponding to the seal lips 62. As a result, the configuration of Embodiment 1 can compress the seal lips 62 with an appropriate compression force between the inner peripheral surface of the housing recess 28 and the second protrusions 34, and can improve the sealing property of the seal member 60 with respect to the housing member 20.

OTHER EMBODIMENTS OF PRESENT DISCLOSURE

Embodiment 1 above disclosed in this application are to be considered in all respects as illustrative and not restrictive.

In the case of Embodiment 1 above, the holder member 40 is configured as an outer housing. In contrast, according to another embodiment, the holder member may be a rear holder that does not have a fitting tubular portion.

In the case of Embodiment 1 above, the housing member 20 having the first protrusions 32 and the second protrusions 34 is configured as an inner housing, and the holder member 40 having the third protrusions 47 is configured as an outer housing. In contrast, according to another embodiment, contrary to Embodiment 1 above, the housing member having the first protrusions and the second protrusions may be configured as an outer housing, and the holder member having the third protrusions may be configured as an inner housing. Also, according to another embodiment, the holder member having the third protrusions may be omitted.

In the case of Embodiment 1 above, the rear ends of the second insertion holes 68 are closed inside the seal member 60. In contrast, another embodiment may have a shape such that the rear ends of the second insertion holes are open to the rear surface of the seal member (the other seal facing surface), and the second insertion holes pass through the seal member in the thickness direction.

In the case of Embodiment 1 above, the second insertion holes 68 include the corner insertion holes 68A and the intermediate insertion holes 68B, and the second protrusions 34 include the corner protrusions 34A and the intermediate protrusions 34B. In contrast, according to another embodiment, the second insertion holes may include only the corner insertion holes, and the second protrusions may include only the corner protrusions. Also, according to another embodiment, the second insertion holes may include a plurality of intermediate insertion holes between adjacent corner insertion holes, and the second protrusions may include the intermediate protrusions between adjacent corner protrusions.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a seal member; and a housing member that holds the seal member, wherein the seal member includes a plurality of seal holes into which wires are to be inserted in an intimate contact state, a plurality of first insertion holes that are open to one seal facing surface facing the housing member and are arranged around of the seal holes, and a plurality of second insertion holes that are open to the one seal facing surface and are arranged at four corners of an outer periphery of a portion having the first insertion holes and the seal holes, and the housing member includes a plurality of cavities that are respectively in communication with the seal holes and in which the wires are to be disposed, a plurality of first protrusions that protrude from another housing facing surface facing the seal member and are arranged to be respectively insertable into the first insertion holes, and a plurality of second protrusions that protrude from the other housing facing surface, have a protrusion length larger than that of the first protrusions, and are arranged to be respectively insertable into the second insertion holes.

2. The connector according to claim 1, wherein the second insertion holes are longer than the first insertion holes when viewed in a thickness direction of the seal member.

3. The connector according to claim 2, further comprising:

a holder member that holds the seal member between the holder member and the housing member, wherein the holder member includes a plurality of through holes that are in communication with the seal holes and in which the wires are to be disposed, a plurality of third protrusions that protrude from peripheries of the through holes, on one holder facing surface facing the seal member, the seal member includes a plurality of third insertion holes that are arranged side-by-side with the first insertion holes in the thickness direction and are open to another seal facing surface facing the holder member, the third protrusions are respectively insertable into the third insertion holes, and the second insertion holes are each longer than the first insertion holes and the third insertion holes when viewed in the thickness direction.

4. The connector according to claim 1, wherein the housing member has a housing recess in which the seal member is housed, the seal member has a plurality of seal lips that are in intimate contact with an inner peripheral surface of the housing recess, the seal lips are arranged on an outer periphery of the seal member side-by-side in the thickness direction of the seal member, and the second insertion holes are formed in a length range such that the second insertion holes overlap the plurality of seal lips when viewed in the thickness direction.

5. The connector according to claim 1, wherein the second protrusions each have a larger diameter than the first protrusions.

* * * * *